Patented Dec. 17, 1929

1,740,125

UNITED STATES PATENT OFFICE

FREDERICK W. SULLIVAN, JR., OF WHITING, INDIANA, ASSIGNOR TO STANDARD OIL COMPANY, OF WHITING, INDIANA, A CORPORATION OF INDIANA

MANUFACTURE OF HIGH-MELTING-POINT WAX

No Drawing.  Application filed July 23, 1924.  Serial No. 727,671.

The present invention relates to improvements in the manufacture of high melting point waxes, more particularly paraffin waxes, and will be fully understood from the following description thereof.

In present practice, it is customary to manufacture high melting point paraffin waxes from lower melting point paraffin waxes by the process known as "sweating," in which process the low melting point paraffin wax is subjected to a slowly and gradually increasing heat, whereby its lower melting point portions are melted and drained from the higher melting point fractions. This process is invariably accompanied by considerable losses of high melting point waxes, which are carried off, to a large extent in solution, by the melted fractions of the wax. Thus, in the sweating of 122 to 124° F. melting point paraffin wax for the production of 130° melting point wax by the sweating process, the yield of the higher melting point wax is in general only about 5 to 15%.

In accordance with the present invention the low melting point wax from which the higher melting point wax is to be prepared is subjected to distillation under conditions characteristic of sub-atmospheric pressure distillation at temperatures below 650° F. and preferably about 520 to 550° F. The phrase "distillation under conditions characteristic of sub-atmospheric distillation" is intended to be a generic term covering the two standard methods of low temperature distillation, that is vacuum distillation and distillation with steam or the like. The distillation may be carried out under vacuum or, preferably, with steam or other suitable injected inert gas. When vacuum is employed, it is preferred that the absolute pressure be in the order of 5 to 10 millimeters of mercury. When steam is employed, it is preferred that sufficient be used to provide one or two volumes of condensed water per volume of distillate taken off.

The distillation is carried on until a residue is produced having the desired melting point. This high melting point residue may be further refined, if desired, by treating with sulfuric acid or by filtration through fuller's earth or by both, these operations being conducted in the usual manner. If desired, the residue may be further distilled with steam or under vacuum at a temperature below 650°, and preferably below 550° F., the high melting point wax being then removed as a distillate. When proceeding in this manner, a residue of 10 to 20 per cent is left in the still to prevent excessive discoloration of the wax distillate.

As an example of an operation conducted in accordance with this invention, paraffin wax of the grade known as 122 to 124° melting point and having an initial melting point of 122° was subjected to distillation with steam at a temperature of about 520° F. The distillation was continued until a residue having the desired melting point (130° F.) was obtained. A yield of such wax of 68% of the original wax treated was secured. This residue of high melting point wax may be distilled with steam, if desired, and the wax removed as a distillate. Preferably from 10 to 20% is left in the still as a residue. If desired, a fresh batch of low melting point wax may be added to this residue, and the combined material retreated in the same manner. Substantially similar results are obtained by distillation under vacuum, for example, at 5 to 10 millimeters pressure.

By a similar distillation of 127° F. melting point wax, a yield of 86% of 130° melting point wax was obtained; the yield in this case, as in the preceding case, being materially higher than the yield secured by the sweating process. In each case the first distillate was found to be a low melting point (about 114° F.) paraffin wax.

The process may also be used in the treatment of crude scale wax containing but small proportions (2 to 5%) of oil, for the production of the various grades of commercial paraffin wax. In general the process is not applicable to waxy materials containing in excess of 5% of oil.

I claim:

1. The method of manufacturing high melting point hydrocarbon waxes from lower melting point hydrocarbon waxes containing a small proportion of high boiling point oil which comprises subjecting the low melting point wax to distillation under conditions characteristic of sub-atmospheric pressure distillation and at temperatures below 650° F., thereby removing oil and low melting point wax.

2. The method of producing high melting point paraffin wax from lower melting point paraffin wax grades containing not more than 5% of oil of high boiling point in which such lower melting point grades of paraffin wax are subjected to distillation with steam to the formation of a residue having the desired melting point characteristics.

3. The method of producing high melting point paraffin wax from lower melting point paraffin wax grades containing a small proportion of oil of high boiling point in which such lower melting point grades of paraffin wax are subjected to distillation with steam to the formation of a residue having the desired melting point characteristics and the said residue of high melting point wax is distilled with steam to a 10 to 20% bottom the high melting point wax being removed as a distillate.

4. The method of producing high melting point paraffin wax from lower melting point grades of paraffin wax containing a small proportion of oil of high boiling point, in which such lower melting point paraffin wax is subjected to distillation with steam at temperatures of 520 to 550° F. to the formation of a residue having the desired melting point characteristics.

FREDERICK W. SULLIVAN, Jr.